(12) United States Patent
Joachimsthaler

(10) Patent No.: US 11,608,906 B2
(45) Date of Patent: Mar. 21, 2023

(54) CONTROL DEVICE, SYSTEM AND METHOD FOR CONTROLLING A FLUIDIC ACTUATOR

(71) Applicant: Festo SE & Co. KG, Esslingen (DE)

(72) Inventor: Matthias Joachimsthaler, Karlsruhe (DE)

(73) Assignee: Festo SE & Co. KG, Esslingen (DE)

( * ) Notice: Subject to any disclaimer, the term of this patent is extended or adjusted under 35 U.S.C. 154(b) by 274 days.

(21) Appl. No.: 16/928,642

(22) Filed: Jul. 14, 2020

(65) Prior Publication Data

US 2021/0018110 A1    Jan. 21, 2021

(30) Foreign Application Priority Data

Jul. 18, 2019  (DE) .................. 10 2019 210 599.8

(51) Int. Cl.
*F16K 31/02* (2006.01)
*G05B 11/01* (2006.01)
*F16K 31/44* (2006.01)

(52) U.S. Cl.
CPC .............. *F16K 31/02* (2013.01); *F16K 31/44* (2013.01); *G05B 11/01* (2013.01)

(58) Field of Classification Search
CPC .......... F16K 31/02; F16K 31/44; G05B 11/01
See application file for complete search history.

(56) References Cited

U.S. PATENT DOCUMENTS

| 6,999,853 B2 * | 2/2006 | Junk .................. G05D 16/2013 700/282 |
| 7,337,041 B2 * | 2/2008 | Junk ...................... F15B 5/006 700/285 |
| 2004/0236472 A1 | 11/2004 | Junk et al. |
| 2011/0239853 A1 | 10/2011 | Wheater |
| 2016/0273676 A1 | 9/2016 | Junk |

FOREIGN PATENT DOCUMENTS

| DE | 3600364 A1 | 7/1987 |
| DE | 4319022 A1 | 12/1994 |
| WO | 2018055229 A1 | 3/2018 |

\* cited by examiner

*Primary Examiner* — Eric Keasel
(74) *Attorney, Agent, or Firm* — Hoffmann & Baron, LLP

(57) ABSTRACT

A control device for providing a position controller mode for closed-loop position control of an actuator member of a fluidic actuator which can be driven by a pressurized fluid, wherein the control device is configured to activate a pressure controller mode in response to the actuator member being located in a position target range given by a target position value of the closed-loop position control, and, in the pressure controller mode, to carry out a closed-loop pressure control of the pressurized fluid on the basis of a target pressure value.

11 Claims, 2 Drawing Sheets

CONTROL DEVICE, SYSTEM AND METHOD FOR CONTROLLING A FLUIDIC ACTUATOR

BACKGROUND OF THE INVENTION

The invention pertains to a control device for providing a position controller mode for closed-loop controlling the position of an actuator member of a fluidic actuator controllable by a pressurized fluid.

The control device is a positioner, for example. The control device is especially designed for use in industrial automation, especially in process automation. The control device may be referred to as closed-loop control device.

The control device carries out the closed-loop position control of the actuator member by providing the pressurized fluid—in particular by the control device applying the pressurized fluid to a pressure chamber of the fluidic actuator in order to change the position of the actuator member. The pressurized fluid provided by the control device shall also be referred to as fluidic control signal.

A control device that has a pressure sensor device (or has access to pressure values from an external pressure sensor device) may be adapted to perform a cascaded closed-loop control. In a cascaded closed-loop control, the pressure is controlled as subordinate control loop and the position is controlled as superordinate control loop. The subordinate control loop may also be referred to as slave control loop and the superordinate control loop may also be referred to as master control loop. As an example, a cascaded closed-loop control uses the output of a position controller as reference variable for a pressure controller. The cascaded closed-loop control allows a more robust control, especially with regard to disturbances (such as external forces, temperature effects and/or leakage). Disturbances occurring in the pressure—i.e. especially in the subordinate control loop—can be corrected by the closed loop control before they cause positional faults—especially in the superordinate control loop. The cascaded closed-loop control allows a better control quality to be achieved for the closed-loop position control.

A problem with the cascaded closed-loop control is its high energy requirement. Generally, the subordinate control loop must be executed at least as fast or faster (i.e. with a higher time resolution) than the superordinate control loop in order to ensure stable control. As a result, the energy requirement of the cascaded closed-loop control is significantly higher than that of a simple closed-loop position control.

Often, the control device has only a very small energy budget available, especially if the control device is designed as a 2-wire positioner. The target values are typically provided to the control device via a 4-20 mA current interface, and the control device usually has to make do with the energy provided by the current interface. With the cascaded closed-loop control, the pressure sensors would have to be read out with a short cycle time. However, this would exceed the energy budget of the 2-wire positioner, especially if a position control takes place at the same time.

SUMMARY OF THE INVENTION

It is an object of the invention to provide a control device which enables a robust and energy-efficient closed-loop control of the actuator member.

The control device is configured to activate a pressure controller mode in response to the actuator member being located in a position target range predetermined by a target position value of the closed-loop position control, and, in the pressure controller mode, to perform a closed-loop pressure control of the pressurized fluid on the basis of a target pressure value.

Accordingly, the pressure controller mode is activated under a specified condition—namely that the actuator member is in the position target range. Thus, the pressure controller mode is not constantly active. This allows the energy consumption of the closed-loop control to be limited. At the same time, by providing the pressure controller mode, the robustness of the closed-loop control can be increased, since the actuator member can be kept in the position target range by the closed-loop pressure control (at least in the event of minor faults).

In particular, the position target range is a position range that includes the position specified by the target position value as well as a tolerance range surrounding this position. The position target range can also be referred to as the control deadband ("Reglertotband" in German).

The control device is in particular configured to switch from the position controller mode to the pressure controller mode in response to the actuator member being located in the position target range. By switching the control device from the position controller mode to the pressure controller mode, it is expediently possible, despite the limited energy budget, to use both closed-loop controls—the closed-loop position control and the closed-loop pressure control—and thus to increase the robustness of the closed-loop control in the stationary case (when the actuator member is in the position target range). Small disturbances are appropriately compensated by the closed-loop pressure control without the actuator member leaving the target position range.

As an alternative to switching from the position controller mode to the pressure controller mode, the control device may also be configured to switch on the pressure controller mode in addition to the position controller mode, in response to the actuator member being located in the position target range. Preferably, the control device is configured to switch on the pressure controller mode only when the actuator member is located in the position target range.

With a pure position control (as typically used for 2-wire positioners), there is often the problem that the closed-loop controller can only react to a disturbance if the disturbance has led to a significant change in position. In this case, it is possible that the actuator member leaves the position target range—in particular the desired operating range. By activating the closed-loop pressure control as described above, the control device can react to disturbances, particularly in the state in which the actuator member is located in the target position range, and thus prevent the actuator member from leaving the target position range.

Thus, by additionally switching on the closed-loop pressure control or by switching from the closed-loop position control to the closed-loop pressure control (especially when the closed-loop position control is in the control dead band and is inactive), the advantages of the closed-loop pressure control may be used. In particular, slow disturbances such as heat effects or small disturbances such as leakage can be compensated by the closed-loop pressure control without changing the position of the actuator member.

According to a preferred configuration, the control device is configured to disable the position controller mode in response to the actuator member being located within the position target range. Expediently, the control device performs a controller shutdown of the position controller when the actuator member is located within the position target range in order to disable the position controller mode.

Alternatively, to deactivate the position controller mode, the control device sets the position controller signal, which is output by the position controller, to zero and/or prevents its transmission. Expediently, the position controller mode is inactive when the pressure controller mode is active. Preferably, the pressure controller mode is only active when the position controller mode is inactive. In this way, the energy consumption of the closed-loop control can be limited even further.

The pressure controller mode is used in particular to maintain the pressure of the pressurized fluid measured at the time the position controller mode is deactivated. Expediently, the control device is configured to detect a pressure of the pressurized fluid in response to the actuator member being located in the position target range and to use the detected pressure as the target pressure value for the closed-loop pressure control.

The closed-loop pressure control carried out in the pressure controller mode is expediently carried with a relatively low temporal resolution—i.e. a relatively long cycle time. The control device is configured to carry out the closed-loop pressure control with a lower temporal resolution (i.e. a longer cycle time) than the closed-loop position control. Due to the longer cycle time, no more energy is expediently consumed for the closed-loop pressure control than for the closed-loop position control.

Expediently, the control device is configured to adapt the cycle time of the closed-loop pressure control to the available energy of the control device. In particular, the control device is configured to measure the available energy and to adapt the cycle time of the closed-loop pressure control on the basis of the measured energy, in particular dynamically. Expediently, the control device sets and/or adapts controller parameters dynamically in this context. The lower the selected cycle time, the better the control performance and thus the better the robustness, since faster and larger disturbances can be compensated. By adjusting the closed-loop pressure control and the cycle time, disturbances (leakage, heat effects) can be optimally compensated before the actuator member moves out of the position target range.

Expediently, the closed-loop pressure control can be operated with a longer cycle time, as the closed-loop pressure control only has to compensate for small disturbances, such as slow temperature drifts, leakage, etc.

A larger disturbance causes the actuator member to leave the position target range, in which case the position controller is reactivated and compensates the larger disturbance until the actuator member is again in the position target range (in which the position controller is deactivated again).

The pressure controller is expediently only active when the closed-loop position control is deactivated, i.e. when it is in a controller shutdown. The deactivation of the closed-loop position control—i.e. the controller shutdown—is effected in particular by the control device setting the position control signal to zero and/or preventing the position controller signal from being passed on to a coupling member and/or a control system. Furthermore, to deactivate the closed-loop position control, a position controller unit can be completely shut down, so that the position controller signal is no longer calculated. Expediently, the control device is configured to deactivate the pressure controller mode in response to the actuator being outside the target position range.

The invention further pertains to a method for controlling a fluidic actuator which can be driven by a pressurized fluid, the fluidic actuator having an actuator member, the method comprising the steps: performing closed-loop position control of the actuator member by providing the pressurized fluid, and in response to the actuator member being located in a position target range given by a target position value of the closed-loop position control, performing a closed-loop pressure control of the pressurized fluid based on a target pressure value.

The method is expediently adapted in correspondence with an embodiment of the control device. Preferably, the method is carried out with the control device.

BRIEF DESCRIPTION OF THE DRAWINGS

Further exemplary details and exemplary embodiments are explained below with reference to the figures.

DETAILED DESCRIPTION

Figure 1:
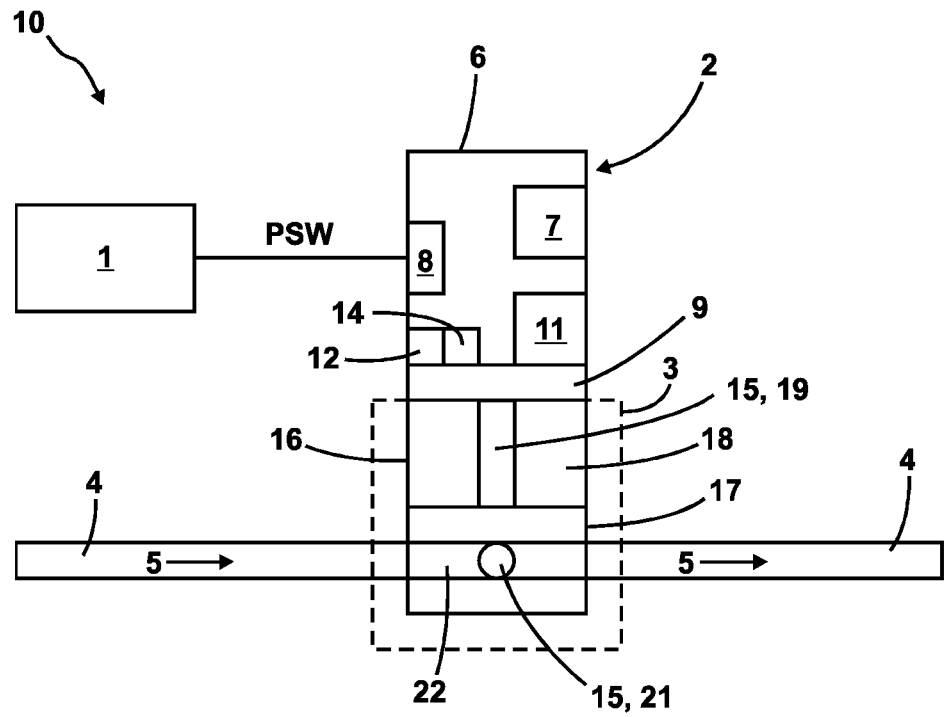
FIG. 1 shows a schematic representation of a fluidic system.

FIG. 1 shows a schematic diagram of a fluidic system 10, which includes a higher-level controller 1, a control device 2, a fluidic actuator 3 and a fluid line arrangement 4.

The fluidic system 10 is in particular an industrial facility, preferably a process technology facility.

The fluidic system 10 serves in particular to influence the flow of a fluid 5, in particular a process fluid, through the fluid line arrangement 4, in particular to selectively stop or enable the flow and/or to adjust its flow velocity. The influencing of the flow of the fluid 5 is carried out via an actuator member 15 which can be moved into different positions.

As an example, the higher-level controller 1 provides a target position value PSW to the control device 2. The target position value PSW specifies a target position for the actuator member 15. Based on the target position value PSW, the control device 2 provides a fluidic control signal FSS, in particular a pneumatic control signal, and controls the fluidic actuator 3 with the fluidic control signal FSS in order to move the actuator member 15 to a specified position and/or to hold it in a specified position. Expediently, the control device 2 outputs a pressurized fluid, in particular compressed air, to provide the fluidic control signal FSS.

It shall be noted that the fluidic system 10 is a purely exemplary application of the control device 2. The control device 2 can also be used for a different application and can in particular be provided on its own (i.e. without the other components of the system 10).

Expediently, the control device 2 is used to control an actuator member of a different fluidic, especially pneumatic, actuator, for example to control the piston of a drive cylinder. According to a possible configuration, an arrangement of the control device 2 and a drive cylinder is provided, whereby the control device 2 is designed to perform a closed-loop control of the piston of the drive cylinder.

The control device 2 is, for example, a positioner. The control device 2 is especially designed for use in industrial automation, especially in process automation. The control device 2 is a field device, especially for industrial use. The control device 2 is exemplarily a 2-wire device, especially a 2-wire positioner. Expediently, the control device 2 is connected to the higher-level controller 1 via two conductors and receives both the target position value PSW and the electrical energy used for operation of the control device 2 via these two conductors.

As an example, the control device 2 comprises a housing 6, which is preferably cubic or cylindrical.

The control device 2 further comprises, as an example, a computer unit 7, for example a microcontroller, on which a closed-loop controller, in particular a closed-loop controller algorithm, is provided, expediently for providing the position controller mode and/or the pressure controller mode explained below. The computer unit 7 is located in particular in the housing 6.

As an example, the control device 2 further includes an analog current interface 8, which is expediently a 4-20 mA analog current interface. The control device 2 is configured to receive the target position value PSW via the analog current interface 8, in particular from the higher-level controller 1. The control device 2 is configured to receive the energy required for the operation of the control device 2 via the analog current interface 8. As an example, the control device 2 generates the electrical energy used for its operation from the interface current of the analog current interface 8. In particular, the computer unit 7 and the electro-pneumatic converter 11 explained below, the position sensor device 12 and/or the pressure sensor device 14 are operated with the electrical energy from the interface current. As an example, the interface current is provided by the higher-level controller 1. The analog current interface 8 is expediently located on or in the housing 6.

As an example, the control device 2 further includes a mechanical interface 9 for attaching the control device 2 to the fluidic actuator 3. The mechanical interface 9 is located on the housing 6 as an example.

The control device exemplarily comprises an electro-pneumatic converter 11. The control device 2 is configured to output the pressurized fluid with the electro-pneumatic converter 11 in order to provide the fluidic control signal FSS for the control of the fluidic actuator 3. The electro-pneumatic converter 11 is expediently located in housing 6.

The control device 2 exemplarily comprises a position sensor device 12. The control device 2 is expediently configured to detect an actual position of the actuator member 15 by means of the position sensor device 12 and to provide the actual position as an actual position value PIW. The position sensor device 12 is expediently arranged in or on the housing 6.

The control device 2 exemplarily comprises a pressure sensor device 14. The control device 2 is expediently configured to detect an actual pressure of the pressurized fluid provided by the control device 2 by means of the pressure sensor device 14 and to provide the actual pressure as an actual pressure value DIW. The pressure sensor device 14 is expediently located in or on the housing 6.

The higher-level controller 1 is a programmable logic controller, PLC, for example. The higher-level controller 1 is especially configured to provide the target position value PSW for the control device 2. As an example, the higher-level controller 1 provides the target position value as an analog current value, in particular as an analog current value in the range of 4-20 mA. Expediently, the higher-level controller 1 provides the power supply for the control device 2 via the current with which the target position value PSW is transmitted to the control device 2.

The fluidic actuator 3 includes a valve device as an example. The valve device is especially designed as a process valve unit. The fluidic actuator 3, in particular the valve device, preferably comprises a fluidic drive unit 16 and/or a valve fitting 17, in particular a process valve.

The fluidic actuator 3, exemplarily the fluidic drive unit 16, exemplarily comprises a pressure chamber 18, which is supplied with the fluidic control signal FSS provided by the control device 2. The fluidic actuator 3, e.g. the fluidic drive unit 16, further includes a control member 19, which can be changed in its position by applying the fluidic control signal FSS to the pressure chamber 18. According to a possible design, the control member 19 represents the actuator member 15. The control member 19 is a piston, for example.

The fluidic actuator 3, for example the valve fitting 17, comprises a valve member 21, which represents the actuator member 15, for example. As an example, the valve member 21 is located in a fluid line section 22, through which the fluid 5 flows. The valve member 21 is expediently coupled to the control member 19 and is expediently moved together with the control member 19 when the control member 19 is moved. By applying the fluid control signal FSS to the pressure chamber 18, the valve member 21 can be changed in its position, in particular via its coupling to the control member 19.

According to a possible design, an arrangement comprising the control device 2 and the fluidic actuator 3 is provided. Expediently, the control device 2 is arranged at, in particular on, the fluidic actuator 3 and is in particular attached to the fluidic actuator 3 by means of the mechanical interface 9.

Figure 2:
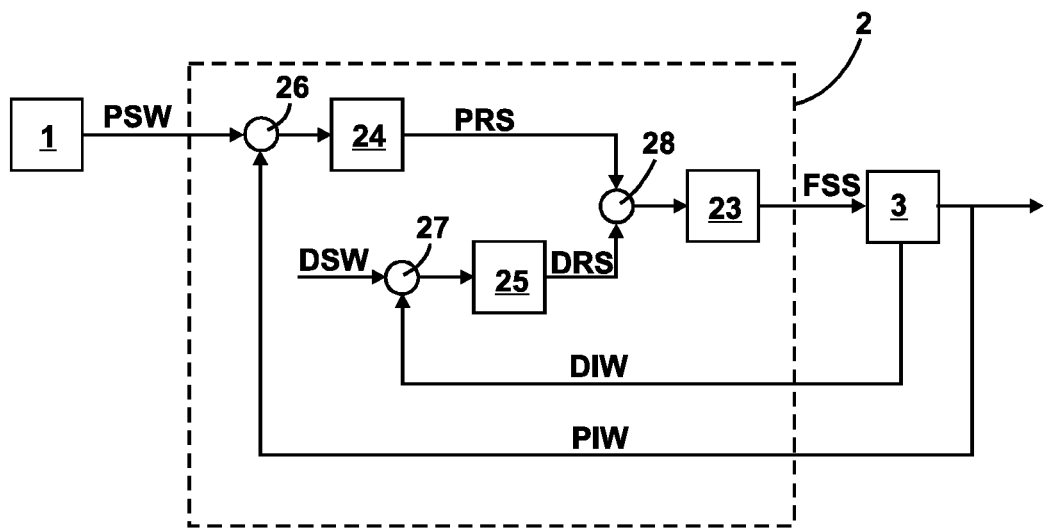
FIG. 2 shows a block diagram of the fluidic system.

FIG. 2 will be discussed in more detail below. FIG. 2 shows a block diagram of the system 10. FIG. 2 is used in particular to explain the controller structure of the control device 2.

The control device 2 includes a control system 23 for the provision of the fluid control signal FSS. The control system 23 may also be referred to as actuating system 23. The control system 23 is in particular the electro-pneumatic converter 11 mentioned above. The control system 23 is configured to provide the control signal FSS (either) on the basis of a position controller signal PRS or on the basis of a pressure controller signal DRS.

The control device 2 comprises, as an example, a coupling member 28, via which the position controller signal PRS or the pressure controller signal DRS is fed to the control system 23. Exemplarily, the coupling member 28 is a summing element.

The control device 2 comprises exemplarily a position controller unit 24 for providing the position controller signal PRS, in particular on the basis of a deviation, preferably a difference, between the target position value PSW and the actual position value PIW.

The control device 2 comprises, as an example, a position comparator 26 for providing the deviation, in particular the difference, between the target position value PSW and the actual position value PIW. The position comparator 26 is preferably designed as a subtracting element.

The actual position value PIW represents a feedback variable. The actual position value PIW expediently indicates a position of the actuator member 15, which position is detected in particular by means of the position sensor device 12.

The control device 2 comprises exemplarily a pressure controller unit 25 for providing the pressure controller signal DRS, in particular on the basis of a deviation, preferably a difference, between the target pressure value DSW and the actual pressure value DIW.

The control device 2 comprises, as an example, a pressure comparator 27 for providing the deviation, in particular the difference, between the target pressure value DSW and the actual pressure value DIW. The pressure comparator 27 is preferably designed as a subtracting element.

The actual pressure value DIW represents a feedback variable. The actual pressure value DIW expediently indicates a pressure of the pressurized fluid output by the control device 2 for providing the fluidic control signal FSS, which pressure is detected in particular by means of the pressure sensor device 14. The actual pressure value DIW preferably indicates the pressure in the pressure chamber 18.

As an example, the control device 2 provides two parallel controller loops—a position controller loop and a pressure controller loop. The position controller loop includes, for example, the position comparator 26, the position controller unit 24, the coupling element 28 and the control system 23. The pressure controller loop includes, for example, the pressure comparator 27, the pressure controller unit 25, the coupling element 28 and the control system 23. As will be explained in more detail below, the control device 2 is expediently configured to use only one of the two controller loops at any time, so that only one of the two controller loops is active at any time. Expediently, the two control loops share the coupling element 28, the control system 23 and the fluidic actuator 3.

Expediently, the control device 2 is configured to output the pressurized fluid (by means of the electro-pneumatic converter 11) both for the closed-loop position control and for the closed-loop pressure control, in order to provide the fluid control signal FSS.

Preferably, the control device 2 does not have a cascaded controller structure. In particular, the closed-loop pressure control is not subordinate to the closed-loop position control performed in the position controller mode.

Preferably the control device 2 is configured to provide the position comparator 26, the position controller unit 24, the coupling member 28, the pressure comparator 27 and/or the pressure controller unit 25 by means of the computer unit 7. Expediently, the computer unit 7 provides these units/members by means of a controller program.

In the following, the closed-loop control carried out by the control device 2 will be discussed in more detail.

The control device 2 is configured to provide a position controller mode for the closed-loop position control of the actuator member 15. The control device 2 is further configured to provide a pressure controller mode for the closed-loop control of the pressure of the supplied pressurized fluid. According to a possible configuration, the control device 2 at any time provides only one of the two modes—either the position controller mode or the pressure controller mode. Which of the two modes is provided by the control device 2 at a given time is determined by whether the actuator member 15 is inside or outside a position target range, as further explained below. Alternatively, the control device 2 is adapted to switch on the pressure controller mode in addition to the position controller mode in response to the actuator member 15 being located within the position target range.

First the position controller mode will be discussed:

As an example, the control device 2 is configured to use the position control loop described above in the position controller mode. In particular, the control device 2 is configured to provide the fluid control signal FSS in the position controller mode on the basis of the position controller signal PRS.

In the position controller mode, the position controller unit 24 is active. Furthermore, in the position controller mode, the position sensor device 12 regularly, in particular cyclically, detects the actual position value PIW.

In the position controller mode, the position comparator 26 forms the deviation, in particular the difference, between the target position value PSW and the actual position value PIW detected by the position sensor device 12. Based on the deviation, the position controller unit 24 provides the position controller signal PRS. Expediently, the position controller unit updates the position controller signal PRS regularly, in particular cyclically. The position controller signal PRS is fed to the control system 23 via the coupling member 28. Based on the position controller signal PRS, the control system 23 provides the fluidic positioning signal FSS, which is fed to the fluidic actuator 3 and leads to a position change of the fluidic actuator member 15 to a position corresponding to the target position value. The current position of the fluidic actuator member 15 is detected by the position sensor device 12 as the actual position value PIW and fed back to the position deviation member 26 as a feedback variable.

While the position controller mode is active, the pressure controller mode is expediently inactive. Preferably, the control device 2, in particular the computer unit 7, does not perform any closed-loop pressure control of the pressurized fluid in the position controller mode. Expediently, the control device 2, in particular the pressure sensor device 14, does not carry out a measurement of the actual pressure value PIW in the position controller mode. In particular, the computer unit 7 does not read out the pressure sensor device 14 in the position controller mode. Preferably, the pressure controller unit 25 and/or the pressure sensor device 14 is inactive in the position controller mode. Preferably, the pressure controller unit 25 does not output a pressure controller signal DRS in the position controller mode.

Now to the pressure controller mode:

The control device 2 is configured to perform a closed-loop pressure control of the pressurized fluid in the pressure controller mode on the basis of a target pressure value DSW.

As an example, the control device 2 is configured to use the pressure control loop described above in the pressure controller mode. In particular, the control device 2 is configured to provide the fluid control signal FSS in the pressure controller mode on the basis of the pressure controller signal DRS.

In the pressure controller mode, the pressure controller unit 25 is active. Furthermore, in the pressure controller mode, the pressure sensor device 14 regularly, in particular cyclically, detects the actual pressure value PIW.

In the pressure controller mode, the pressure comparator 27 forms the deviation, in particular the difference, between the target pressure value DSW and the actual pressure value DIW detected by the pressure sensor device 14. Based on the deviation, the pressure controller unit 25 provides the pressure controller signal DRS. Expediently, the pressure controller unit 25 updates the pressure controller signal DRS regularly, in particular cyclically. The pressure controller signal DRS is supplied to the control system 23 via the coupling member 28. Based on the pressure controller signal DRS, the control system 23 provides the fluidic control signal FSS which is fed to the fluidic actuator 3 and leads to a pressure change of the pressurized fluid to a pressure corresponding to the target pressure value. The current pressure of the pressurized fluid is detected by the pressure sensor device 14 as the actual pressure value DIW and fed back to the pressure deviation member 27 as a feedback variable.

Expediently, the control device 2 is configured to detect a pressure of the pressurized fluid in response to the actuator member 15 being located in the position target range and to use the detected pressure as the target pressure value DSW for the closed-loop pressure control. The target pressure value DSW thus corresponds in particular to the pressurized fluid pressure that is present when the actuator member 15 reaches the position target range (or when the position controller mode is deactivated).

While the pressure controller mode is active, the position controller mode is preferably inactive. Preferably, the control device 2, in particular the computer unit 7, does not carry out any closed-loop position control of the actuator member 15 in the pressure controller mode. Preferably, the position controller unit 24 is inactive in the pressure controller mode. Preferably, the position controller unit 24 does not output a position controller signal PRS in the pressure controller mode.

Expediently, the control device 2, in particular the position sensor device 12, continues to carry out a detection of the actual position value PIW in the pressure controller mode, in particular in order to be able to detect that the actuator member 15 has left the position target range and to activate the position controller mode in this case.

The control device 2 is expediently configured to perform the closed-loop pressure control with a lower time resolution than the closed-loop position control. Expediently, the control device 2 is configured to update the position controller signal PRS in the position controller mode with a shorter cycle time—i.e. with a higher frequency—than the pressure controller signal DRS is updated in the pressure controller mode. Expediently, the control device 2 is configured to provide the actual position value PIW in the position controller mode with a shorter cycle time—i.e. with a higher frequency—than the actual pressure value DIW is provided in the pressure controller mode. The position control is therefore expediently executed "faster" than the pressure control.

As mentioned above, the control device 2 is configured to determine which mode—the position controller mode or the pressure controller mode—is to be provided, depending on whether the actuator member 15 is in a position target range or not.

Expediently, the control device 2 is configured to switch from the position controller mode to the pressure controller mode in response to the actuator member 15 being located in the position target range. Preferably, the control device 2 is configured to activate the pressure controller mode in response to the actuator member 15 being located in the position target range. Further, the control device 2 is preferably configured to deactivate the position controller mode in response to the actuator member 15 being located in the position target range.

The control device 2 is preferably configured to switch from the pressure controller mode to the position controller mode in response to the actuator 3 being located outside the position target range. The control device 2 is preferably configured to deactivate the pressure controller mode in response to actuator member 15 being located outside the position target range. The control device 2 is preferably configured to activate the position controller mode in response to the actuator member 15 being outside the position target range.

The control device 2 is expediently configured to compare the actual position value PIW with the target position value and/or the position target range to determine whether the actuator member 15 is located in the position target range or outside the position target range.

For example, the position target range is the sum of the target position value and a tolerance range, in particular a tolerance window. The position target range is therefore a value range that includes the target position value and a tolerance range surrounding the target position value.

Figure 3:
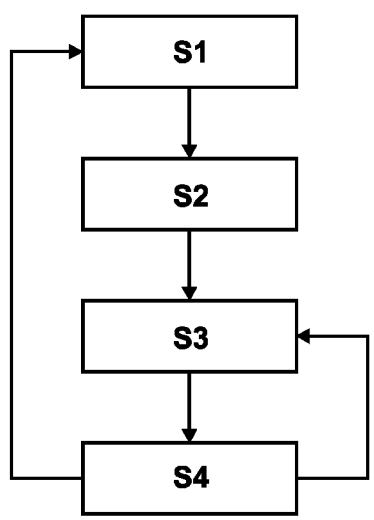
FIG. 3 shows a flow chart of a control device operation.

FIG. 3 shows a flow diagram of a method for controlling the fluidic actuator 3.

The procedure starts with step S1, where the control device 2 determines that the actuator member 15 is not located in the position target range (for example by comparing the actual position value PIW with the position target range). As an example, the control device 2 determines that the actual position value PIW is outside a tolerance range surrounding the position target value PSW.

In response to this determination, the control device 2 performs step S2, in which the control device 2 activates the position controller mode and performs a closed-loop position control of the actuator member 15. The pressure controller mode is inactive in step S2. In the position controller mode, the actuator member 15 is moved towards the position target range by providing the pressurized fluid.

The method continues with step S3, where the control device 2 determines that the actuator member 15 is located in the position target range. As an example, the control device 2 determines that the actual position value PIW is within a tolerance range surrounding the position target value PSW.

In response to this determination, the control device 2 performs step S4, in which the control device 2 activates the pressure controller mode and performs a closed-loop pressure control of the supplied pressurized fluid. In addition, in response to the determination made in step S3, the control device 2 deactivates the position controller mode. The deactivation of the position controller mode is effected in particular in that (with continued calculation of the position controller signal PRS) the calculated position controller signal PRS is not passed on or is set to zero, expediently as long as the actuator member 15 is located within the position target range.

Expediently, the control device 2 continues to monitor whether the actuator member 15 is located in the target position range, even in the pressure controller mode.

If a large or fast disturbance occurs, which moves the actuator member 15 outside the position target range, the control device 2 returns to step S1. In this case, the control device 2 deactivates the pressure controller mode and activates the position controller mode.

If a small or slow disturbance occurs which does not move the actuator member 15 outside the position target range, the control device 2 returns to step S3. In this case, the control device 2 remains in the pressure controller mode and leaves the position controller mode inactive. The inactive position controller mode is achieved, for example, by completely switching off the position controller unit 24 and/or by no longer calculating the position controller signal PRS. Furthermore, the inactive position controller mode can be achieved by not passing on the calculated position controller signal PRS and/or by setting it to zero.

What is claimed is:

1. A control device for providing a position controller mode for closed-loop position control of an actuator member of a fluidic actuator which can be driven by a pressurized fluid, wherein the control device is configured to activate a closed-loop pressure controller mode in response to the actuator member being located in a position target range given by a target position value of the closed-loop position control, and to carry out a closed-loop pressure control of the pressurized fluid on the basis of a target pressure value in the pressure controller mode, and wherein the control device is configured to perform the closed-loop pressure control with a lower temporal resolution than the closed-loop position control.

2. The control device according to claim 1, wherein the control device is configured to deactivate the pressure controller mode in response to the actuator member being located outside the position target range.

3. The control device according to claim 1, wherein the control device is configured to deactivate the position controller mode in response to the actuator member being located within the position target range.

4. The control device according to claim 1, wherein the control device is configured to detect a pressure of the pressurized fluid in response to the actuator member being located in the position target range and to use the detected pressure as the target pressure value for the closed-loop pressure control.

5. The control device according to claim 1, comprising an analog current interface for receiving the target position value and for receiving the energy used for operating the control device.

6. The control device according to claim 1, wherein the control device is designed as a positioner and comprises a mechanical interface for attaching the control device to the fluidic actuator.

7. A system comprising a control device according to claim 1 and the fluidic actuator.

8. The system according to claim 7, wherein the fluidic actuator comprises a valve device.

9. A method for closed-loop controlling a fluidic actuator which can be driven with a pressurized fluid, the fluidic actuator having an actuator member, the method comprising the steps:

performing a closed-loop position control of the actuator member by providing the pressurized fluid, and in response to the actuator member being located in a position target range given by a target position value of the closed-loop position control, performing a closed-loop pressure control of the pressurized fluid with which the fluidic actuator is driven, based on a target pressure value, and wherein the control device is configured to perform the closed-loop pressure control with a lower temporal resolution than the closed-loop position control.

10. A control device for providing a position controller mode for closed-loop position control of an actuator member of a fluidic actuator which can be driven by a pressurized fluid, wherein the control device is configured to activate a closed-loop pressure controller mode in response to the actuator member being located in a position target range given by a target position value of the closed-loop position control, and to carry out a closed-loop pressure control of the pressurized fluid on the basis of a target pressure value in the pressure controller mode, and wherein the control device is configured to detect a pressure of the pressurized fluid in response to the actuator member being located in the position target range and to use the detected pressure as the target pressure value for the closed-loop pressure control.

11. The control device according to claim 10, wherein the control device is configured to perform the closed-loop pressure control with a lower temporal resolution than the closed-loop position control.

* * * * *